United States Patent
Isaksson et al.

(10) Patent No.: US 12,222,167 B2
(45) Date of Patent: Feb. 11, 2025

(54) ARRANGEMENT AND A METHOD FOR STORING THERMAL ENERGY IN THE GROUND

(71) Applicants: Jakob Isaksson, Ytterby (SE); Karl Johan Hogmalm, Gothenburg (SE)

(72) Inventors: Jakob Isaksson, Ytterby (SE); Karl Johan Hogmalm, Gothenburg (SE)

(*) Notice: Subject to any disclaimer, the term of this patent is extended or adjusted under 35 U.S.C. 154(b) by 0 days.

(21) Appl. No.: 18/289,149

(22) PCT Filed: May 5, 2022

(86) PCT No.: PCT/SE2022/050440
§ 371 (c)(1),
(2) Date: Nov. 1, 2023

(87) PCT Pub. No.: WO2022/240336
PCT Pub. Date: Nov. 17, 2022

(65) Prior Publication Data
US 2024/0369309 A1    Nov. 7, 2024

(30) Foreign Application Priority Data

May 12, 2021 (SE) ..................................... 2150613-4

(51) Int. Cl.
*F28D 20/00* (2006.01)

(52) U.S. Cl.
CPC ................ *F28D 20/0052* (2013.01)

(58) Field of Classification Search
CPC .... F28D 20/0052; H05B 6/62; E21B 43/2401
USPC ......................................................... 165/45
See application file for complete search history.

(56) References Cited

U.S. PATENT DOCUMENTS

| | | | |
|---|---|---|---|
| 4,570,715 A | 2/1986 | Van Meurs et al. | |
| 6,701,914 B2 | 3/2004 | Schwarz | |
| 8,584,734 B2* | 11/2013 | Shimozono | F01K 3/00 165/10 |
| 8,931,276 B2* | 1/2015 | Kim | F24F 5/0046 60/659 |
| 9,022,118 B2* | 5/2015 | Burns | E21B 43/24 166/302 |
| 9,310,103 B2* | 4/2016 | Wildig | F24T 10/15 |
| 9,341,034 B2* | 5/2016 | Bujold | E21B 33/0407 |

(Continued)

FOREIGN PATENT DOCUMENTS

| | | |
|---|---|---|
| EP | 3118558 A1 | 1/2017 |
| FI | 63480 C | 6/1983 |

OTHER PUBLICATIONS

International Search Report (Jun. 22, 2022) for corresponding International App. PCT/SE2022/050440.

*Primary Examiner* — Jon T. Schermerhorn, Jr.
(74) *Attorney, Agent, or Firm* — WRB-IP PLLC

(57) ABSTRACT

An arrangement for storing thermal energy includes a circuit containing a working fluid, where the circuit has a plurality of pipes which pipes are distributed throughout a volume of the ground forming a heat storage. Each pipe is arranged in a channel in the ground for heat exchange between the working fluid and the ground. The arrangement includes an electrical heating element, where the electrical heating element is arranged in a channel in the ground to heat the ground for storing thermal energy in the heat storage. The working fluid is a liquid having a boiling point above 120° C. at atmospheric pressure.

15 Claims, 7 Drawing Sheets

(56) References Cited

U.S. PATENT DOCUMENTS

| | | | | |
|---|---|---|---|---|
| 9,399,905 B2* | 7/2016 | Nguyen | ............... | E21B 43/24 |
| 9,466,896 B2* | 10/2016 | Harmason | ............ | H02G 15/115 |
| 9,709,337 B2* | 7/2017 | Pilebro | ............... | F28D 20/0043 |
| 9,822,592 B2* | 11/2017 | Bujold | ................... | E21B 36/00 |
| 9,885,235 B2* | 2/2018 | Xia | ....................... | E21B 47/103 |
| 10,125,589 B2* | 11/2018 | Zowarka | ................. | H05B 6/10 |
| 10,900,372 B2* | 1/2021 | Graucob | .............. | H02K 7/1823 |
| 11,499,785 B2* | 11/2022 | France | ................. | F28D 7/0066 |
| 11,655,697 B2* | 5/2023 | Curlett | ................ | E21B 43/2401 |
| | | | | 166/65.1 |
| 2007/0193744 A1 | 8/2007 | Bridges | | |

\* cited by examiner

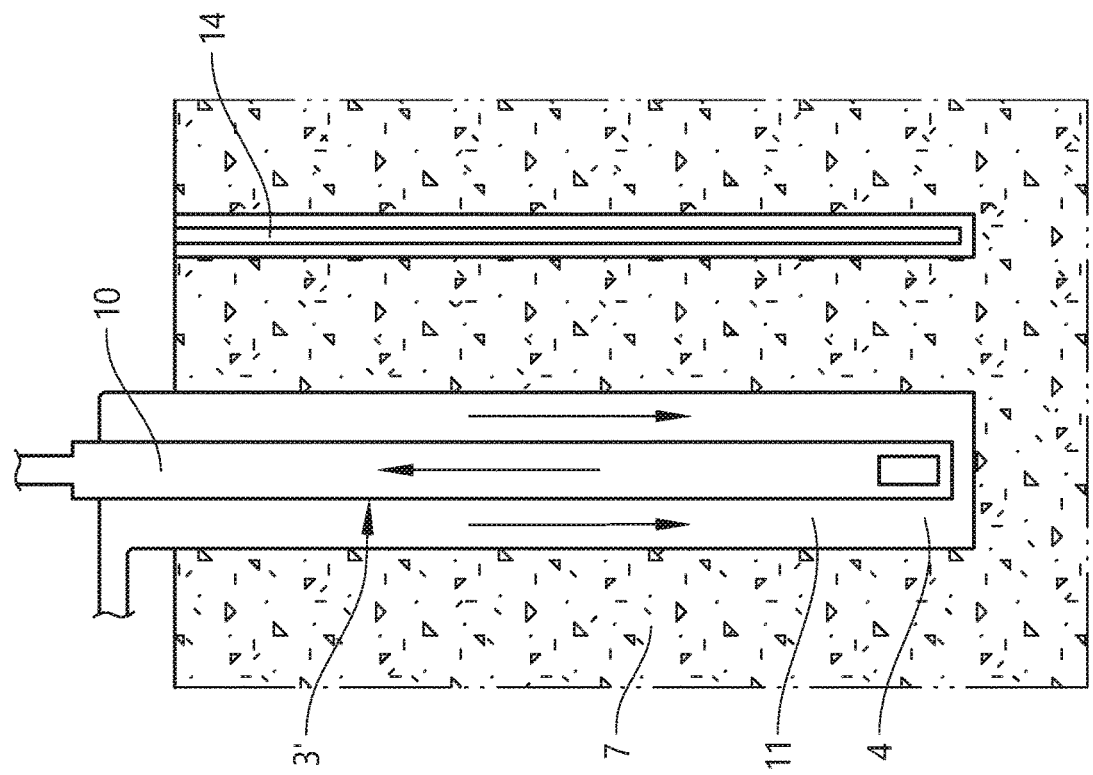
FIG. 2B
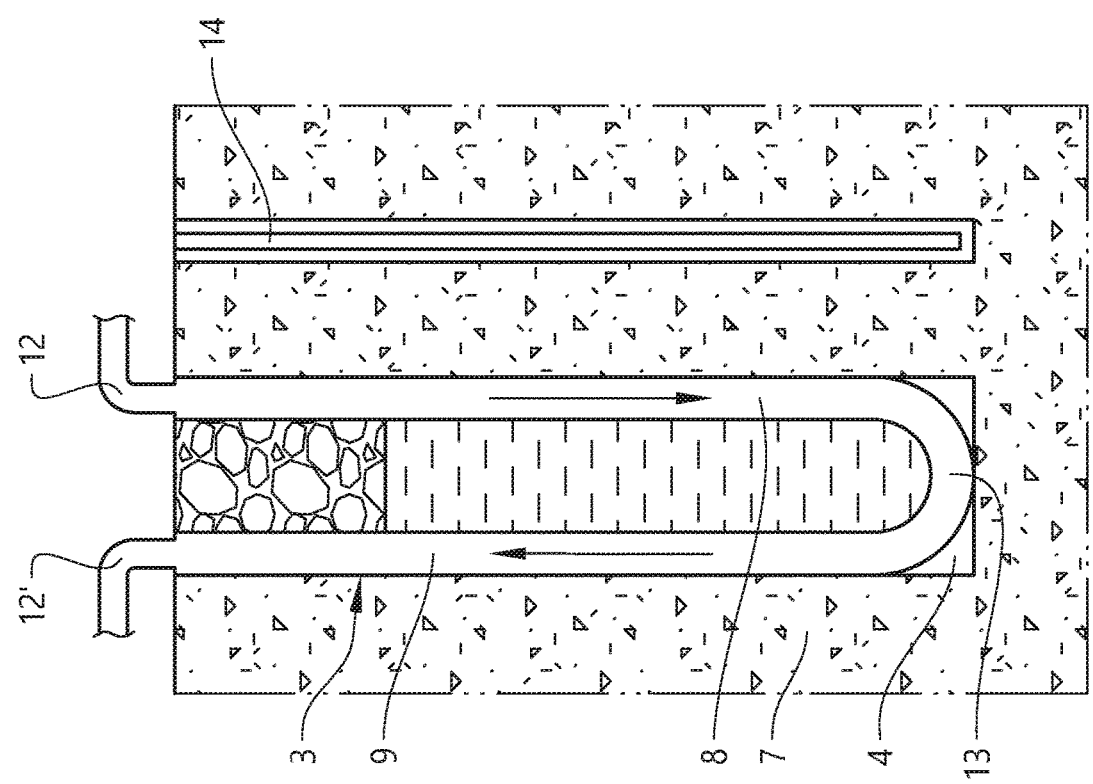
FIG. 2A A-A

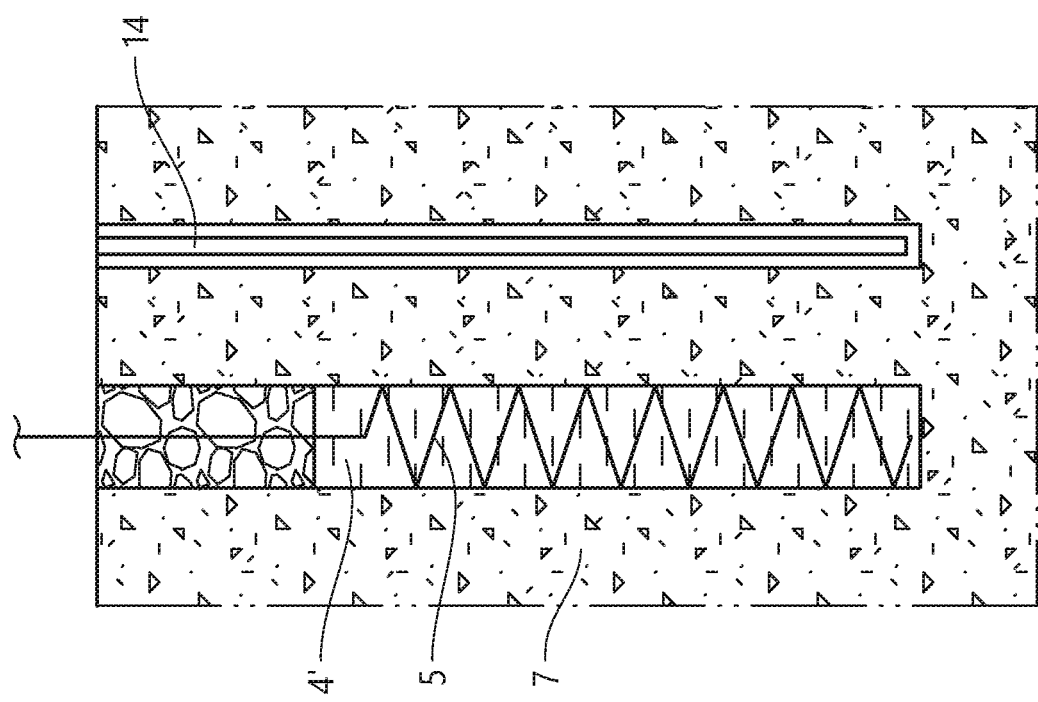
FIG. 2C B-B

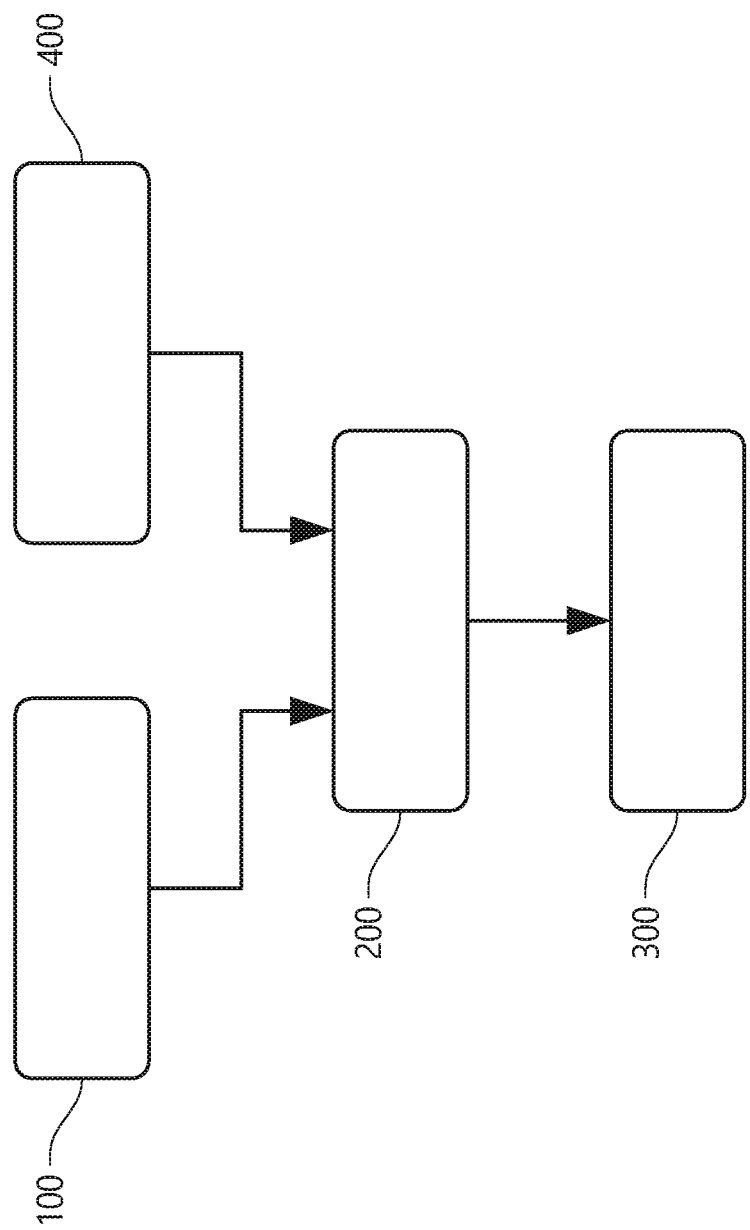

ARRANGEMENT AND A METHOD FOR STORING THERMAL ENERGY IN THE GROUND

BACKGROUND AND SUMMARY

The invention relates to an arrangement and a method for storing thermal energy.

There is a need for storing energy. Weather and seasonal changes cause variations in both production and consumption of heat and electricity. Today there are some methods available for storing energy. For example, hot water can be stored in pits, rock shelters and drill holes, and electricity can be stored in batteries or as potential energy by pumping water into reservoirs.

All these storing methods have one or more drawbacks, such as having low efficiency and high costs, being unsuitable for longer storage periods, providing too low temperature when the energy is to be retrieved and used, etc.

Thus, there is still a need for efficient storage of thermal energy, particularly for long term storage between seasons, in order to improve the energy supply in today's society.

It is desirable to provide an arrangement for storing thermal energy, by which arrangement thermal energy can be stored in a heat storage for longer periods while providing energy retrieval from the storage at relatively high temperatures. According to an aspect of the present invention, an arrangement is provided for storing thermal energy, where the arrangement comprises a circuit containing a working fluid, and the circuit has a plurality of pipes which pipes are distributed throughout a volume of the ground forming a heat storage, and each pipe is arranged in a channel in the ground for heat exchange between the working fluid and the ground, and where the arrangement comprises an electrical heating element, and the electrical heating element is arranged in a channel in the ground to heat the ground for storing thermal energy in the heat storage, and the working fluid is a liquid having a boiling point above 120° C. at atmospheric pressure.

The invention is based on the insight that by such an arrangement, electrical energy can be efficiently converted to heat energy by means of the electrical heating element, which heat energy in turn can be stored for long periods at high temperatures in the ground in an efficient way. Such direct heating of the ground is efficient, for example as compared to indirect heating where an electric heater heats water which water in turn is used for heating the ground. By the invention, an electrical energy surplus can be directly converted into heat in the heat storage. Although, theoretically, the ground can be heated to temperatures up to the melting point of the current bedrock or sediment, as an example only, a typical temperature interval for the heat storage can be 120-600° C.

Hereby it is possible to both store heat from high-temperature heat sources and provide thermal energy from the heat storage at high temperatures sufficient for production of district heating, process heating and/or heat or steam for electricity generation. At the same time, the system can work at atmospheric pressure without any pressurization of the working fluid.

Contrary to the general opinion, the inventors have discovered that increased temperature in the heat storage will not necessarily increase the losses associated to groundwater motions, since minor fractures and porosities will be closed when the rock mass expands making the bedrock denser. Further, boiling of present groundwater will result in a vapor pressure that will push away adjacent groundwater from a central hot zone of the storage to a surrounding colder zone. In this way further groundwater is prevented from reaching the heat storage which creates a dry environment in the heat storage and reduced convective heat losses.

Since the electrical heating element has its own channel and each pipe is arranged in a separate channel, each pipe is arranged at a distance from the electrical heating element. This in turn makes it possible to heat the rock mass around the electrical heating element to temperatures above the maximum allowed temperature of the working fluid in the pipes. This allows a higher average storage temperature and therefore a greater energy density of the heat storage. Energy can be stored by using higher power of the electrical heating element due to the temperature gradient in the bedrock between the electric heating element and the pipes.

The use of the pipes and the electrical heating element being separated from each other will also allow storage of heat from low temperature energy sources by the pipes and from electricity by the electrical heating element. Storing of heat from a low temperature energy source can be performed until the temperature of the bedrock approaches the temperature of the low temperature energy source. The electrical heating element can provide heat simultaneously and/or be used after the heat storage has reached the temperature of the low temperature energy source, to further increase the temperature. In addition, heat from the electrical heating element can be stored in the heat storage while heat is being extracted from the heat storage by the circulating working fluid of the pipes.

According to one embodiment of the arrangement, the circuit comprises a subcircuit having a set of pipes of the plurality of pipes, which pipes are fluidly connected in series and arranged at different distances from the electrical heating element. Hereby, the pipes can be arranged in different temperature zones, and when heat from the heat storage is to be retrieved by the circuit, the working fluid can be circulated in the subcircuit such that heat exchange between the working fluid and the ground takes place at different temperatures, where the working fluid first enters a pipe situated in a zone with relatively low temperature and thereafter enters pipes in zones with higher temperatures, and finally enters a pipe situated in the zone with the highest temperature.

According to a further embodiment, the arrangement comprises a heat exchanger and the subcircuit is fluidly connected to the heat exchanger for energy supply from the heat storage. Hereby, the heat of the working fluid can be transferred to another energy carrier in a rational way.

According to a further embodiment of the arrangement, the circuit comprises a plurality of said subcircuit, which subcircuits are connected in parallel to the heat exchanger. Hereby, the heat transfer power can be increased. One or more such subcircuits can be used at the same time depending on the current temperatures of the heat storage and the heat transfer power required.

According to a further embodiment of the arrangement, a set of pipes of the plurality of pipes is arranged along an imaginary circle where each pipe is arranged at substantially the same distance from a centre point, when looking at the ground from above. Hereby, these pipes can be situated at different positions in the heat storage but in a zone where the ground has substantially same temperature. The centre point can be a centre point of the heat storage, or a local centre point for a part of the heat storage, where heat is transferred to the ground for storing thermal energy.

According to a further embodiment of the arrangement, the electrical heating element is arranged inside the imaginary circle, preferably in the centre point. Hereby, the ground can be heated and by conduction of heat radially from the electrical heating element, the set of pipes arranged along the imaginary circle will be situated in the same temperature zone.

According to a further embodiment, the arrangement comprises a plurality of said set of pipes, which sets of pipes are arranged along different imaginary circles, the imaginary circles being arranged concentrically having the centre point in common. Hereby, the different sets of pipes can be situated in different temperature zones.

According to a further embodiment, the arrangement comprises a plurality of said electrical heating element, which electrical heating elements are distributed throughout the volume of the ground forming the heat storage. Hereby, the heat can be stored more evenly throughout the heat storage and a plurality of temperature zones having substantially the same temperature can be achieved for several temperatures.

According to a further embodiment of the arrangement, the working fluid has a working temperature range from a lowest allowable temperature to a highest allowable temperature for which working temperature range the working fluid is a liquid at atmospheric pressure. Hereby, a non-complicated system not requiring pressurization of the system can be achieved.

According to a further embodiment of the arrangement, the working fluid is a liquid having a boiling point above 150° C., and preferably above 200° C., at atmospheric pressure. By using a working fluid having a relatively high boiling point, the system can work with a liquid at high temperatures. This in turn makes it possible to both storing heat from high-temperature heat sources and providing thermal energy from the heat storage at high temperatures sufficient for production of district heating, process heating and/or heat or steam for electricity generation. At the same time, the system can work at atmospheric pressure without any pressurization of the working fluid.

According to a further embodiment of the arrangement, the working fluid is an oil or a compound or element in a liquid state, such as a molten salt Hereby, a suitable working fluid with a relatively high boiling point (in comparison to water) having favourable heat transfer properties can be used in the circuit of the arrangement.

The invention also relates to a method for storing thermal energy, comprising the steps of heating a volume of the ground forming a heat storage, by an electrical heating element, the electrical heating element being arranged in a channel in the ground to heat the ground for storing thermal energy in the heat storage, and transferring heat from the heat storage to an energy carrier for energy supply, by a circuit containing a working fluid, using the working fluid being a liquid having a boiling point above 120° C. at atmospheric pressure, the circuit having a plurality of pipes which pipes are distributed throughout said volume of the ground, each pipe being arranged in a channel in the ground for heat exchange between the working fluid and the ground.

The invention is based on the insight that by such a method, electric energy can be efficiently converted to heat energy by means of the electrical heating element, which heat energy in turn can be stored for long periods at high temperatures in the ground in an efficient way. Such direct heating of the ground is efficient, for example as compared to indirect heating where an electric heater heats water which water in turn is used for heating the ground. By the invention, an electrical energy surplus can be directly converted into heat in the heat storage. Although, theoretically, the ground can be heated to temperatures up to the melting point of the current bedrock or sediment, as an example only, a typical temperature interval for the heat storage can be 120-600° C.

Hereby it is possible to both store heat from high-temperature heat sources and provide thermal energy from the heat storage at high temperatures sufficient for production of district heating, process heating and/or heat or steam for electricity generation. At the same time, the system can work at atmospheric pressure without any pressurization of the working fluid.

According to one embodiment of the method, the method comprises the step of using the working fluid having a working temperature range from a lowest allowable temperature to a highest allowable temperature for which working temperature range the working fluid is a liquid at atmospheric pressure. Hereby, a non-complicated method not requiring pressurization of the system can be achieved.

According to a further embodiment, the method comprises the step of using the working fluid being a liquid having a boiling point above 150° C., and preferably above 200° C., at atmospheric pressure. By using a working fluid having a relatively high boiling point, the system can work with a liquid at high temperatures. This in turn makes it possible to both storing heat from high-temperature heat sources and providing thermal energy from the heat storage at high temperatures sufficient for production of district heating, process heating and/or heat or steam for electricity generation. At the same time, the system can work at atmospheric pressure without any pressurization of the working fluid.

According to a further embodiment, the method comprises the step of transferring heat from an external energy source to the working fluid of the circuit, for storing thermal energy in the heat storage, where the temperature of the working fluid is increased to above 120° C., suitably above 150° C., and preferably above 200° C. by the external energy source. Hereby, thermal energy, in addition to heat produced by the electrical heating element, can be stored in the heat storage at high temperatures by heat exchanging between the working fluid and the ground. Heat from an external high-temperature heat source can be used for increasing the temperature of the working fluid, such as for example heat from a solar thermal plant.

Further advantages and advantageous features of the invention are disclosed in the following description and in the claims.

BRIEF DESCRIPTION OF THE DRAWINGS

With reference to the appended drawings, below follows a more detailed description of embodiments of the invention cited as examples.

In the drawings:

FIG. 2A shows a cut view along A-A in FIG. 1, illustrating a channel accommodating a pipe in the form of a U-pipe heat exchanger used in the arrangement, FIG. 2B shows a variant of the pipe in FIG. 2A designed as a coaxial pipe heat exchanger.

FIG. 2C shows a cut view along B-B in FIG. 1, illustrating a channel accommodating an electrical heating element and the surrounding ground, FIG. 6 is a schematic flow chart for illustration of an example embodiment of a method.

DETAILED DESCRIPTION

Figure 1:
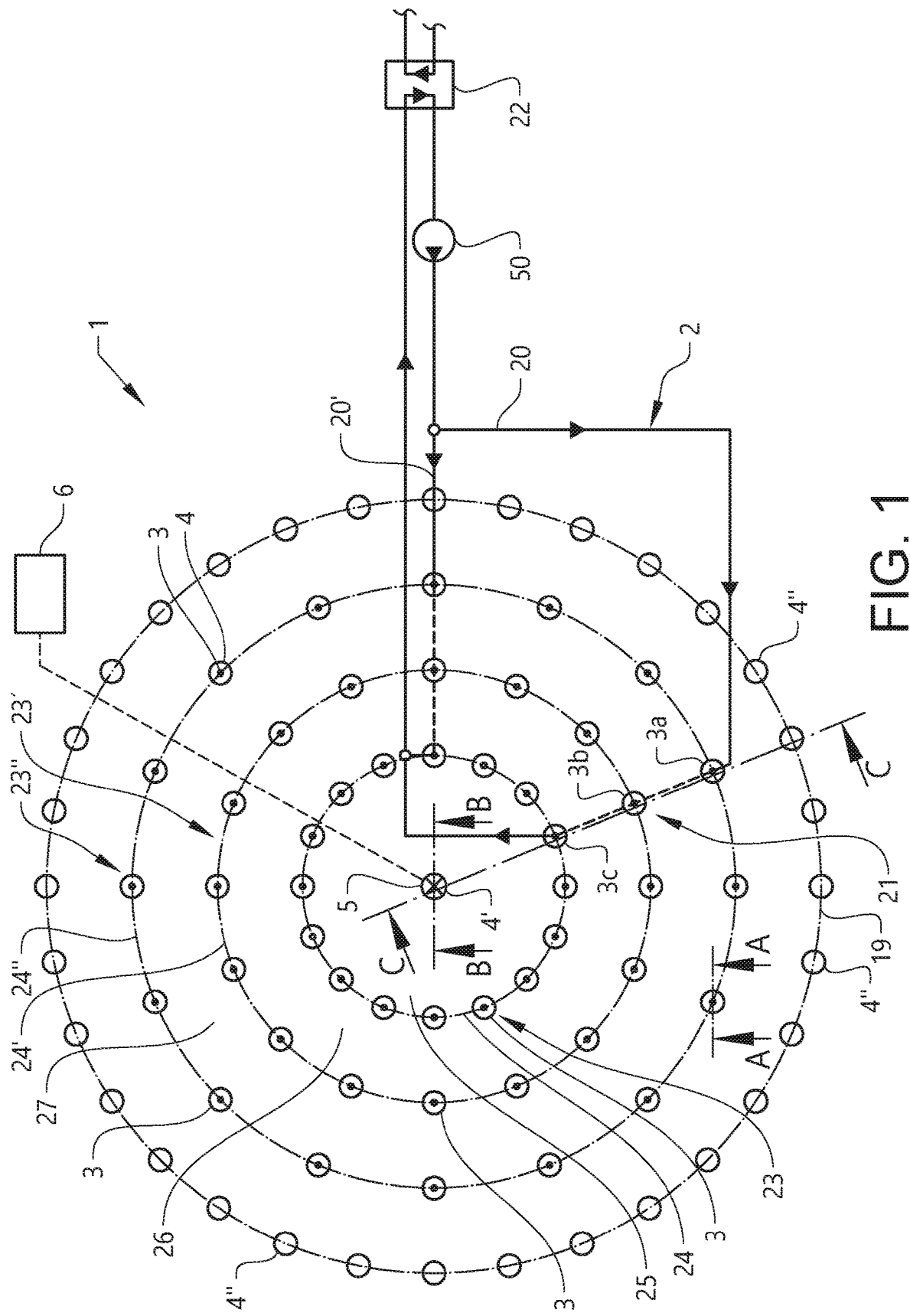
FIG. 1 is a schematic view showing an arrangement for storing thermal energy.

FIG. 1 is a schematic view showing an arrangement 1 for storing thermal energy. The arrangement 1 is illustrated in a top view looking at the ground from above. The arrangement 1 is a so called underground thermal energy storage. The arrangement 1 comprises a circuit 2 containing a working fluid. The working fluid is circulated in the circuit 2. The circuit 2 is at least partly arranged in the ground, preferably most of or substantially the entire circuit 2 is arranged underground, though for illustration purposes the circuit 2 is shown in FIG. 1. The heat storage utilizes the soil, sediment and/or bedrock, which is found naturally in the ground below the surface of the earth, for storing heat.

The circuit 2 has a plurality of pipes 3, 3a, 3b, 3c which pipes 3 are distributed throughout a volume of the ground forming a heat storage. Such a pipe 3 is indicated by a small circle with a dot inside the circle. Each pipe 3 is arranged in a channel 4 in the ground for heat exchange between the working fluid and the ground. Such a pipe 3 arranged in such a channel 4 forms a working fluid collector well. Each channel 4 can be a borehole, preferably a vertical borehole, in the ground for receiving the vertically arranged pipe 3.

The volume of the ground forming the heat storage is defined by the surface area over which the pipes are distributed and the length of these pipes 3, i.e. the depth of the channels 4 accommodating the pipes 3.

Further, the arrangement 1 comprises an electrical heating element 5. The electrical heating element 5 is indicated by a small circle and a cross in FIG. 1. The electrical heating element 5 is arranged in a channel 4' in the ground to beat the ground, thereby storing thermal energy in the heat storage. The electrical heating element 5 has its own channel 4' in the ground. In other words; the heating element 5 is suitably arranged separately from the pipes 3 in a separate channel. Such an electrical heating element 5 arranged in such a channel 4' forms an electrical heating well. In a similar way as mentioned with respect to the pipes 3, the channel 4' for the electrical heating element 5 is suitably a borehole, preferably a vertical borehole, in the ground for receiving the electrical heating element 5. The distance between the electrical heating element and the closest pipes can be selected based on the power of the electrical heating element, the temperature gradient in the bedrock, the allowed temperature of the working fluid, etc. For example, the distance can be in the range 1-meters, and often 2-5 meters.

The electrical heating element 5 can be a resistive heater converting electrical energy into heat. The electrical heating element 5 is suitably arranged in a central position of the heat storage. Power supply 6 to the electrical heating element 5 is schematically illustrated in FIG. 1.

The working fluid in the circuit 2 suitably has a working temperature range from a lowest allowable temperature to a highest allowable temperature for which working temperature range the working fluid is a liquid at atmospheric pressure. By atmospheric pressure means the standard sea-level pressure, one standard atmosphere, equals 760 mmHg.

The working fluid is a liquid having a boiling point above at least 120° C., suitably above 150° C., and preferably above 200° C., at atmospheric pressure. For many applications, the boiling point of the working fluid can be even higher, above 300° C. Favourable, the boiling temperature of the working fluid is within the interval 200-600° C., and often 300-600° C. For this reason, the working fluid can be an oil or a compound or element in a liquid state, such as a molten salt. Some examples of usable working fluids are vegetable oils, such as refined rapeseed oil, paraffin oils, such as Duratherm HTO and Duratherm HF, silicon oils, such as Duratherm S, and molten salts, particularly ternary mixtures of salt, such as Solar Power Molten Salt A lot of the above-mentioned liquids are also favourable due to the fact that they can work at a relatively low temperatures, where the lowest allowable temperature (pour point) often is within the interval minus 50° C. to minus 5° C. This is advantageous due to decreased risk of clogging and freezing when the system is cold. Pumping of the liquid can be performed at low temperatures since the liquid will maintain a relatively low viscosity at low temperatures.

Different types of pipe 3 can be used. Some examples are shown more in detail in FIGS. 2A and 2B where cut views of a channel accommodating a pipe and the surrounding ground are illustrated.

FIG. 2A is a cut view along A-A in FIG. 1, showing such a pipe 3 in the form of a U-pipe heat exchanger. The channel 4 is a vertical borehole in the ground 7. The U-pipe is part of the circuit 2 such that the working fluid can be circulated while flowing downwards in a first pipe portion 8 and upwards in a second pipe portion 9 of the U-pipe. At the same time, heat can be exchanged between the working fluid and the surrounding ground 7. The pipe 3 can be made of steel for instance.

FIG. 2B shows a variant of such a pipe 3' in the form of a coaxial pipe heat exchanger. The channel 4 is a vertical borehole in the ground. The coaxial pipe configuration has an inner pipe portion and an outer pipe portion 11. The coaxial pipe configuration is part of the circuit 2 such that the working fluid can be circulated while flowing downwards in the outer pipe portion 11 and upwards in the inner pipe portion 10. At the same time, heat can be exchanged between the working fluid and the surrounding ground 7. The pipe 3' can be made of steel for instance. The direction of flow can be reversed in that the fluid flows downwards in the inner pipe portion and upwards in the outer pipe portion if heat is to be transferred from the working fluid to the heat storage.

In other words: the working fluid can flow in the circuit 2 from a position 12 close to the ground surface, to the bottom 13 of the channel 4 and back up to a position 12' close to the ground surface. Of course, the arrangement 1 can be designed such that the flow direction of the working fluid can be reversed for any pipe configuration. The channels and the pipes can have a length for example in the interval 10-200 meter, and often 25-150 meter.

In general, there are two main options of creating the desired circuit 2 for the pipe configuration used. According to a first option, only the pipes which are included in a predetermined subcircuit where the working fluid is to be circulated are fluidly connected to each other, such as in series or in parallel to each other. According to another option, more pipes, or all pipes of the arrangement, are fluidly connected to each other and by means of valves and control equipment the flow can be open or closed between the pipes. Thus, the pipes to be included in a certain subcircuit can be selected by controlling the valves such that the working fluid is circulated through these selected pipes, which pipes can be connected in series or in parallel to each other. Both these options can of course be combined and used in the same heat storage. The circuit 2 with the pipes may comprise two or more subcircuits.

FIG. 2C is a cut view along B-B in FIG. 1, showing the channel 4' accommodating the electrical heating element 5 and the surrounding ground 7. The channel 4' is a vertical borehole in the ground. The electrical heating element 5 is arranged in the channel 4' to emit heat to the surrounding ground 7.

The arrangement 1 may comprise a plurality of said electrical heating element 5, which electrical heating elements 5 are distributed throughout the volume of the ground forming the heat storage. The number of electrical heating elements is suitably adapted to the size of the heat storage and the number and size of the pipes arranged in the channels in the heat storage. The number and power of the electrical heating elements are also suitably adapted to the working fluid used and the current bedrock or sediment of the ground.

For example, the electrical heating elements 5 can be distributed within an inner zone in the centre of the heat storage where the pipes 3 are arranged outside the electrical heating elements or each electrical heating element is arranged in a local centre point or zone of the heat storage where the pipes are arranged outside the respective electrical heating element.

As also indicated in FIGS. 2A, 2B and 2C, sensors 14 can be arranged in the heat storage for measuring any relevant physical quantity, such as the temperature of the heat storage.

For example, a temperature sensor can be used for measuring the temperature of the ground, pipe or the working fluid.

Figure 3:
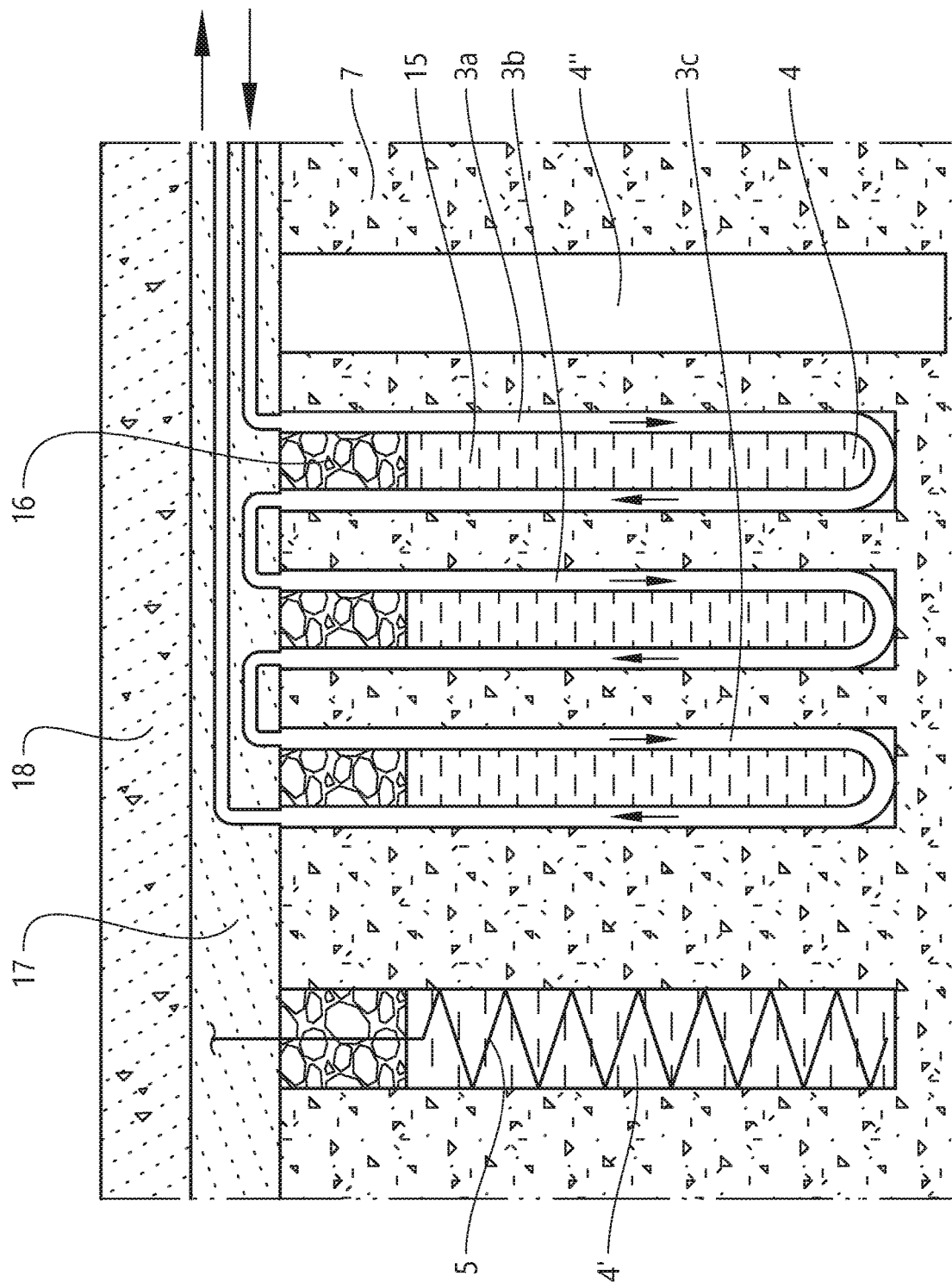
FIG. 3 is a cut view along C-C in FIG. 1, illustrating the electrical heating element arranged in the channel in the centre of the heat storage, three pipes which are fluidly connected to each other in series, where each pipe is arranged in the respective channel, and a further channel.

FIG. 3 is a cut view along C-C in FIG. 1. This view illustrates the electrical heating element 5 arranged in the channel 4' in the centre of the heat storage. Further, as an example, three pipes 3a, 3b, 3c which are fluidly connected to each other in series are shown. Each pipe is arranged in a channel 4. The working fluid is circulated in the circuit 2 to the pipes 3a, 3b, 3c and back again for heat exchanging between the working fluid and the ground 7 when the working fluid flows in the vertical pipes 3a, 3b, 3c. As illustrated, the electrical heating element 5 and the pipes 3 are arranged in the bedrock or sediment in the underground. The channels 4 receiving the pipes are suitably formed by drilling, but may be achieved by any other equipment enabling the pipe to be arranged in the ground.

The pipes 3a, 3b, 3c are arranged in the bedrock or sediment. In case the channels 4 are not completely filled by the pipes 3a, 3b, 3c, a high-conductive filling material can be used for filling the channels 4 and create the heat conduction properties that are required. The high-conductive material can be for example quartz sand or magnetite sand. In the upper part of each channel 4, a low-conductive material 16 is however suitably used for lowering the losses to the ground closest to the surface of the earth. The low-conductive material can be for example extruded clay or foam glass. Immediately above the pipes 3a, 3b, 3c and the bedrock there is a layer 17 of an insulating material, such as foam glass or expanded clay. Portions of the circuit 2 that connect the different pipes 3 to each other, are suitably arranged in this insulating layer 17. On top of the insulating layer 17 a filling material 18, such as soil or grave!, can be arranged.

In addition, a further channel 4" in the form of a vertical borehole is illustrated in FIG. 3. The arrangement may comprise such further boreholes 4" for preventing or at least counteracting ground water from reaching the heat storage. The further boreholes for counteracting inflow of ground water can be used for injection of a sealant into the bedrock, such as cement or colloidal silica and/or any ground water that reaches these boreholes can be pumped away, for example by a submersible pump or sink pump. A further option is to freeze any ground water that reaches these boreholes 4". The arrangement 1 may comprise a plurality of such boreholes 4" in the ground which are arranged along a boundary of the heat storage for counteracting ground water to reach into the heat storage. See also FIG. 1, where a plurality of such further boreholes 4" situated along an outermost circular boundary 19 of the heat storage are indicated by small circles.

Figure 4C:
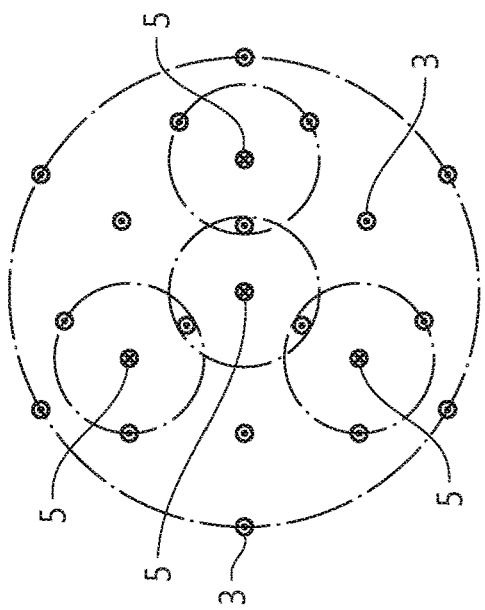
FIGS. 4A, 4B and 4C are schematic top views showing different variants of pipe and electrical heating element configuration of the arrangement.
Figure 4B:
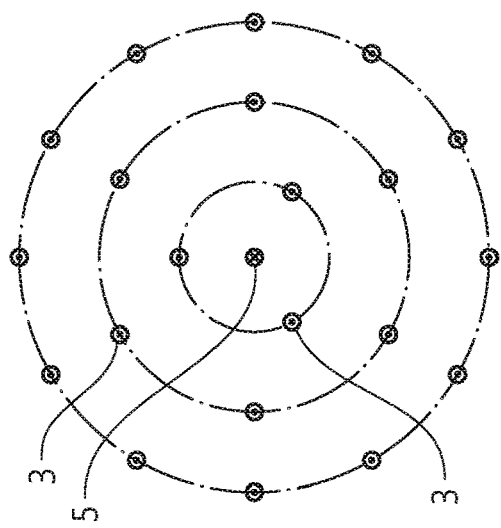
Figure 4A:
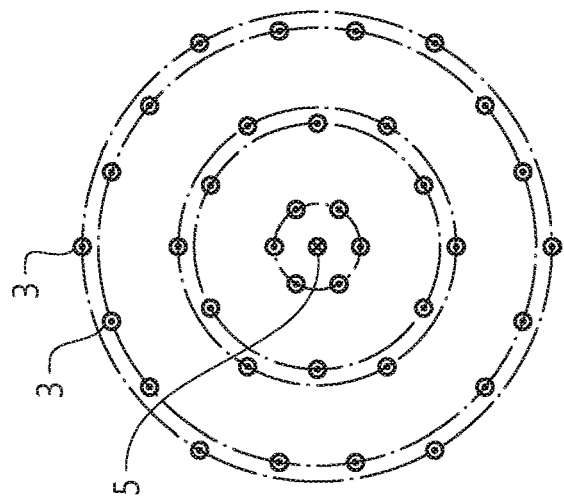

FIGS. 4A, 4B and 4C are schematic top views showing different variants of pipe and electrical heating element configuration. In the example embodiments illustrated in FIGS. 4A and 4B, one electrical heating element 5 is arranged in the centre of the heat storage. The number of pipes 3 arranged outside the electrical heating element 5 at different distances from the centre of the heat storage is greater in FIG. 4A than in FIG. 4B. In the example embodiment illustrated in FIG. 4C, there are four electrical heating elements 5.

One electrical heating element is arranged in the centre of the heat storage, whereas the other three electrical heating elements are distributed in the heat storage. These electrical heating elements 5 form local centre points, and pipes 3 are arranged outside each electrical heating element 5.

As illustrated in FIG. 1, the circuit 2 may comprise a subcircuit having a set 21 of pipes of the plurality of pipes. The number of pipes 3 of each set 21 of pipes can be in the interval 2-20, often 5-15. In this example embodiment, three pipes 3a, 3b, 3c are fluidly connected in series and arranged at different distances from the electrical heating element 5. The working fluid can be circulated in direction from the pipe 3a farthest from the electrical heating element $ to the pipe 3c closest to the electrical heating element 5 when heat is to be transferred from the heat storage to the working fluid, and further to an energy carrier for providing energy supply.

The arrangement 1 preferably comprises a heat exchanger 22 for transferring heat between the working fluid of the circuit 2 and the energy carrier. The subcircuit is fluidly connected to the heat exchanger 22 for energy supply from the heat storage. Further, the arrangement 1 suitably comprises additional equipment, such as a pump 50, for circulating the working fluid in the circuit 2. In the example embodiment illustrated in FIG. 1, the circuit 2 comprises two of said subcircuit, which subcircuits 20, 20' are connected in parallel to the heat exchanger 22. For example, the number of subcircuits can be in the interval 2-30, suitably 5-20. The heat exchanger 22 in turn can be arranged to transfer heat from the working fluid to the energy carrier for energy supply, such as production of district heating, process heating and/or heat or steam for electricity generation.

The arrangement 1 can comprise a set 23 of pipes 3 of the plurality of pipes arranged along an imaginary circle 24 where each pipe 3 is arranged at substantially the same distance from a centre point, when looking at the ground from above. By arranging the electrical heating element 5 inside the imaginary circle 24, preferably in the centre point, the temperature in the heat storage can be substantially the same for the pipes 3 along the imaginary circle 24.

The arrangement 1 may comprise a plurality of said set of pipes, which sets 23, 23' of pipes 3 are arranged along different imaginary circles 24, 24'. The imaginary circles 24, 24' are arranged concentrically having the centre point in common. In the example embodiment illustrated in FIG. 1, there are three such imaginary circles 24, 24', 24" with three sets 23, 23', 23" of pipes 3. In this way the heat storage can be divided into different temperature zones. A first inner zone inside the first imaginary circle 24, an intermediate zone 26 between the first imaginary circle 24 and the second imaginary circle 24', and an outer zone 27 between the second imaginary circle 24' and the third imaginary circle 24", where the temperature is highest in first zone closest to the electrical heating element 5 and lowest in the outer zone at the greatest distance from the electrical heating element 5.

Figure 5C:
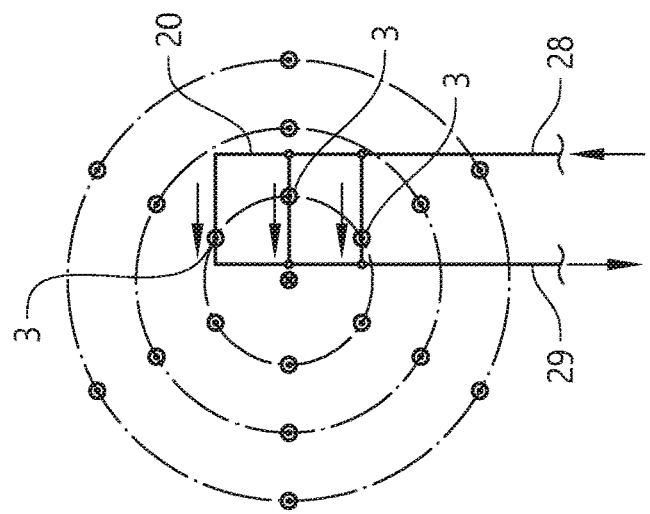
FIGS. 5A, 5B and 5C show some example embodiments of the arrangement with different circuit configuration.
Figure 5B:
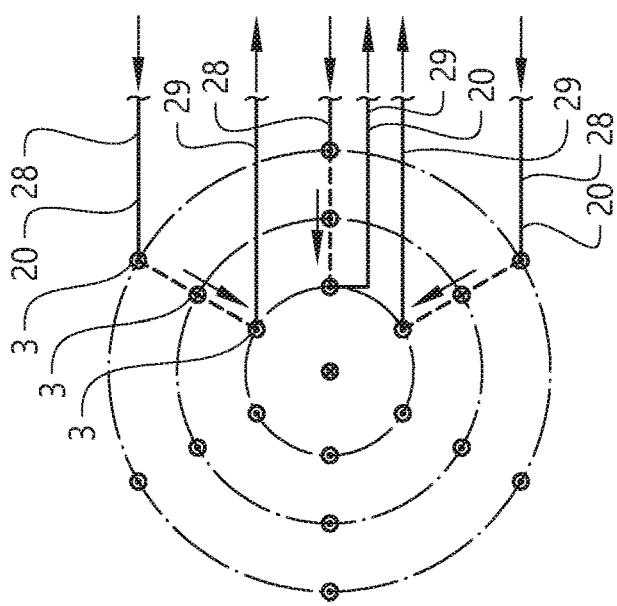
Figure 5A:
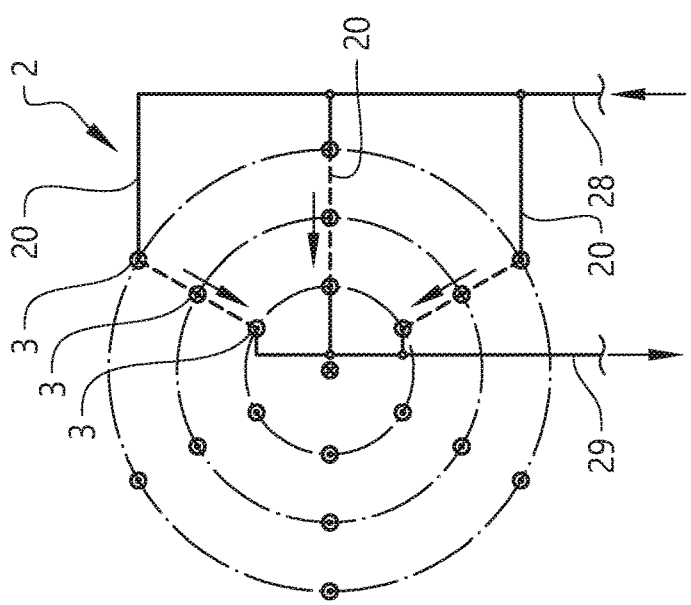

FIGS. 5A, 5B and 5C show some example embodiments of the arrangement with different circuit configurations.

In FIG. 5A, three subcircuits each having three pipes 3 fluidly connected to each other in series, are fluidly connected in parallel to each other in the circuit 2. The pipes 3 within one and the same subcircuit are situated in different temperature zones of the beat storage. For example, the working fluid flows in a supply pipe 28 to the subcircuits and further in each subcircuit to a return pipe 29. The subcircuits can be connected to a heat exchanger via the supply pipe 28 and the return pipe 29.

FIG. 5B shows three subcircuits each having three pipes 3 fluidly connected to each other in series where each subcircuit has a supply pipe 28 and a return pipe 29. For example, these subcircuits can be connected in parallel to a heat exchanger or to separate heat exchangers.

An alternative variant is shown in FIG. 5C. In a subcircuit 20, three pipes 3 are fluidly connected in parallel to each other. The working fluid flows in a supply line 28 and further via each pipe 3 to a return pipe 29. In this example embodiment, the pipes 3 of the subcircuit are arranged in the same temperature zone. As previously described, the supply pipe 28 and the return pipe 29 can be connected to heat exchanger.

FIG. 6 is a schematic flow chart of an example embodiment of a method. As it regards the arrangement 1 and the components thereof, see also previously mentioned figures herein. The method for storing thermal energy comprises the step 100 of heating a volume of the ground forming a heat storage, by an electrical heating element 5. As previously described herein, the electrical heating element 5 is arranged in a channel 4' in the ground 7 to heat the ground for storing thermal energy in the heat storage.

The method further comprises the step 200 of transferring heat from the heat storage to an energy carrier for energy supply 300, by a circuit 2 containing a working fluid. As previously described herein, the circuit 2 has a plurality of pipes 3 which pipes are distributed throughout said volume of the ground, where each pipe 3 is arranged in a channel 4 in the ground 7 for heat exchange between the working fluid and the ground.

According to one example embodiment, before transferring heat from the beat storage to the energy carrier, in addition to the heating by the electrical heating element 5, the method comprises the step 400 of transferring heat from an externa! energy source to the working fluid of the circuit 2, for storing thermal energy in the heat storage, where the temperature of the working fluid being increased to above 120° C., suitably above 150° C., and preferably above 200° C. by the externa! heat source. For example, heat can be transferred from an energy carrier to the working fluid by means of a heat exchanger. Such a heat exchanger used for transferring heat from the externa! heat source to the heat storage can be the same as the heat exchanger 22 used for transferring heat from the heat storage for energy supply, where the working fluid flow direction in the circuit has been reversed.

It is to be understood that the present invention is not limited to the embodiments described above and illustrated in the drawings; rather, the skilled person will recognize that many changes and modifications may be made within the scope of the appended claims.

The invention claimed is:

1. An arrangement for storing thermal energy, the arrangement comprising
    a circuit containing a working fluid, the circuit having a plurality of pipes which pipes are distributed throughout a volume of the ground forming a heat storage, each pipe being arranged in a channel in the ground for heat exchange between the working fluid and the ground, and
    an electrical heating element, the electrical heating element being arranged in a channel in the ground to heat the ground for storing thermal energy in the heat storage, wherein the working fluid is a liquid having a boiling point above 120° C. at atmospheric pressure.

2. An arrangement according to claim 1, wherein the circuit comprises a subcircuit having a set of pipes of the plurality of pipes, which pipes are fluidly connected in series and arranged at different distances from the electrical heating element.

3. An arrangement according to claim 2, wherein the arrangement comprises a heat exchanger and the subcircuit is fluidly connected to the heat exchanger for energy supply from the heat storage.

4. An arrangement according to claim 3, wherein the circuit comprises a plurality of said subcircuit, which subcircuits are connected in parallel to the heat exchanger.

5. An arrangement according to claim 1, wherein a set of pipes of the plurality of pipes is arranged along an imaginary circle where each pipe is arranged at substantially the same distance from a centre point, when looking at the ground from above.

6. An arrangement according to claim 5, wherein the electrical heating element is arranged inside the imaginary circle.

7. An arrangement according to claim 5, wherein the arrangement comprises a plurality of said set of pipes, which sets of pipes are arranged along different imaginary circles, the imaginary circles being arranged concentrically having the centre point in common.

8. An arrangement according to claim 1, wherein the arrangement comprises a plurality of said electrical heating element, which electrical heating elements are distributed throughout the volume of the ground forming the heat storage.

9. An arrangement according to claim 1, wherein the working fluid has a working temperature range from a lowest allowable temperatures to a highest allowable temperature for which working temperature range the working fluid is a liquid at atmospheric pressure.

10. An arrangement according to claim 1, wherein the working fluid is a liquid having a boiling point above 150° C.

11. An arrangement according to claim 1, wherein the working fluid is an oil or a compound or element in a liquid state.

12. A method for storing thermal energy, comprising the steps of
    heating a volume of the ground forming a heat storage, by an electrical heating element, the electrical heating element being arranged in a channel in the ground to heat the ground for storing thermal energy in the heat storage, and transferring heat from the heat storage to an energy carrier for energy supply, by a circuit containing a working fluid, the working fluid being a liquid having a boiling point above 120° C. at atmospheric pressure, the circuit having a plurality of pipes which pipes are distributed throughout said volume of the ground, each pipe being arranged in a channel in the ground for heat exchange between the working fluid and the ground.

13. A method according to claim 12, wherein the working fluid has a working temperature range from a lowest allowable temperature to a highest allowable temperature for which working temperature range the working fluid is a liquid at atmospheric pressure.

14. A method according to claim 12, wherein the working fluid is a liquid having a boiling point above 150° C.

15. A method according to claim 13, wherein the working fluid is a liquid having a boiling point above 150° C. the method comprising transferring heat from an external energy source to the working fluid of the circuit, for storing thermal energy in the heat storage, the temperature of the working fluid being increased to above 120° C. by the external energy source.

* * * * *